United States Patent [19]

Ansley

[11] Patent Number: 5,414,521
[45] Date of Patent: May 9, 1995

[54] DYNAMIC DISTORTION CORRECTION APPARATUS AND METHOD

[76] Inventor: David A. Ansley, 1100 Newport Ave. #405, Long Beach, Calif. 90804-4066

[21] Appl. No.: 759,015

[22] Filed: Sep. 12, 1991

[51] Int. Cl.6 ............................................... H04N 5/74
[52] U.S. Cl. ..................................... 348/123; 348/36; 348/745; 434/44
[58] Field of Search ................... 358/231, 87, 104, 60; H04N 5/74, 9/31; 359/125; 434/44

[56] References Cited

U.S. PATENT DOCUMENTS

| | | | |
|---|---|---|---|
| 3,757,040 | 9/1973 | Bennett | 358/87 |
| 3,992,718 | 11/1976 | Driskell | 358/87 |
| 4,251,929 | 2/1981 | Precicaud | 434/44 |
| 4,343,037 | 8/1982 | Bolton | 358/104 |
| 4,571,631 | 2/1986 | Breglia | 358/231 |
| 4,588,382 | 5/1986 | Petera | 434/44 |
| 4,599,645 | 6/1986 | Brown | 434/44 |
| 4,632,508 | 12/1986 | Connelly | 358/103 |
| 4,634,384 | 1/1987 | Neves | 358/104 |
| 4,656,521 | 4/1987 | Trzeciak | 358/231 |
| 4,763,280 | 8/1988 | Robinson et al. | 364/518 |
| 4,929,040 | 5/1990 | Pagano et al. | 350/6.5 |

FOREIGN PATENT DOCUMENTS

| | | | |
|---|---|---|---|
| 0040320 | 11/1981 | European Pat. Off. | H04N 1/46 |
| 0374857 | 6/1990 | European Pat. Off. | H04N 3/08 |
| 0396128 | 11/1990 | European Pat. Off. | G02B 17/08 |
| 2612718 | 9/1988 | France | H04N 3/08 |
| 2137849 | 10/1984 | United Kingdom | H04N 5/14 |

Primary Examiner—James J. Groody
Assistant Examiner—Chris Grant

[57] ABSTRACT

A dynamic distortion correction apparatus 100 for use in an image projector 120. The invention includes a computer image generator 144 for generating a video image signal. A control circuit 102 processes the video image signal and regulates the clocking rate of a time-delayed video output signal. A modulator 104 is included for converting the video output signal to an optical image signal having a plurality of television raster lines. An optical device 148 is incorporated which orients each of the plurality of raster lines to compensate for distortion in the optical image signal at any viewing angle. A gimballed mirror 126 and a color projection optic device 178 are included to control the projection of the optical image signal onto a surface 110 to provide a display image 106. In a second embodiment, the optical device 148 is replaced by a correcting feature of the computer image generator which causes each of the raster lines to be parallel to every other raster line. In a third embodiment, the optical device 148 is replaced by a feature within the control circuit 102 for linearly spacing a plurality of pixels along each of the raster lines. Finally, in a fourth embodiment, the optical device 148 is replaced by a galvonometer sweep control 150 to linearly space the plurality of raster lines within the optical image signal. In a particular implementation, each of the above-recited elements are included to compensate for distortion in the optical image signal at any viewing angle.

3 Claims, 13 Drawing Sheets

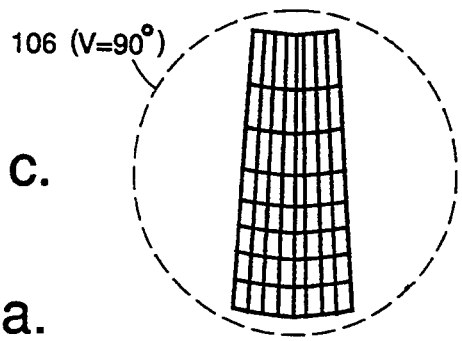
FIG. 1c.
FIG. 1a.
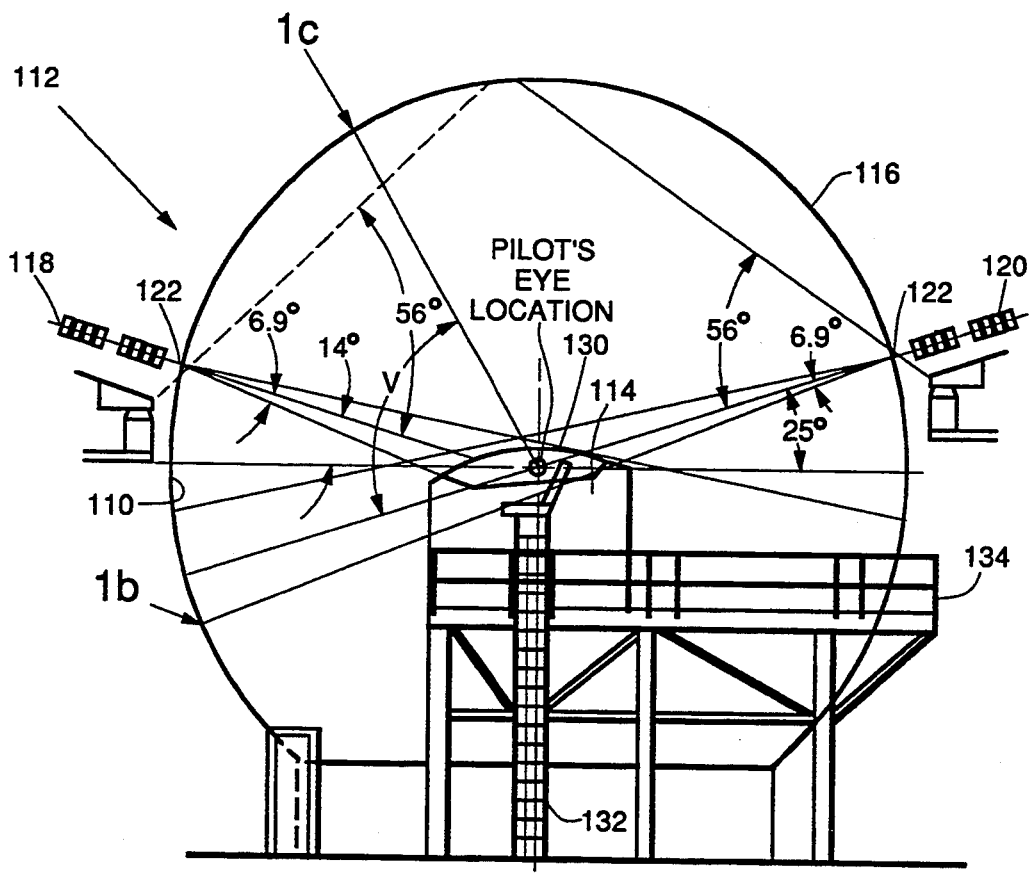
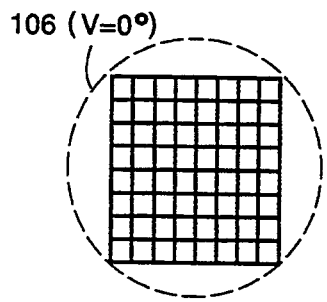
FIG. 1b.

(TIME IN MICROSECONDS)
FREQUENCY VS. TIME CURVES

FIG. 7a.
FIG. 7b.
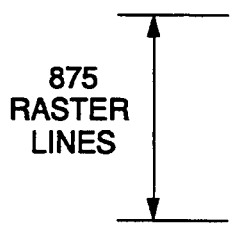
875 RASTER LINES
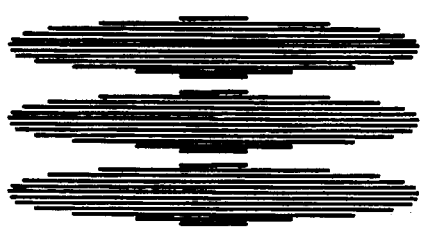
FIG. 7c.
FIG. 10.
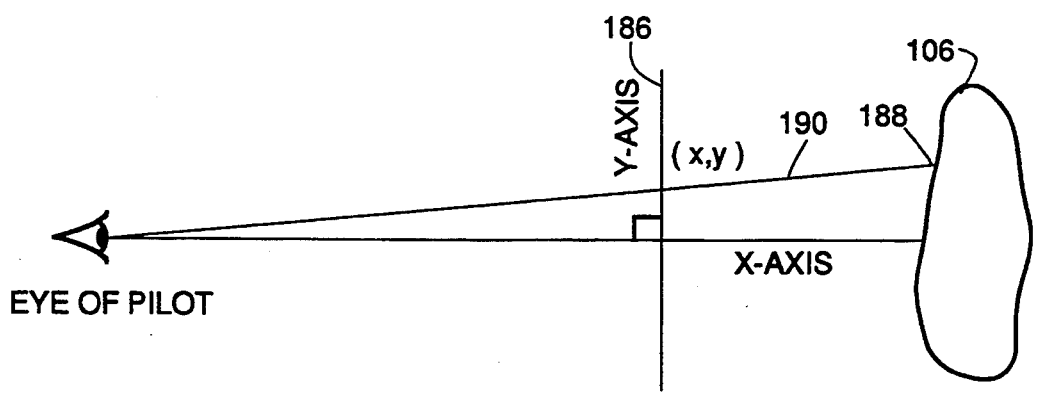
FIG. 11.
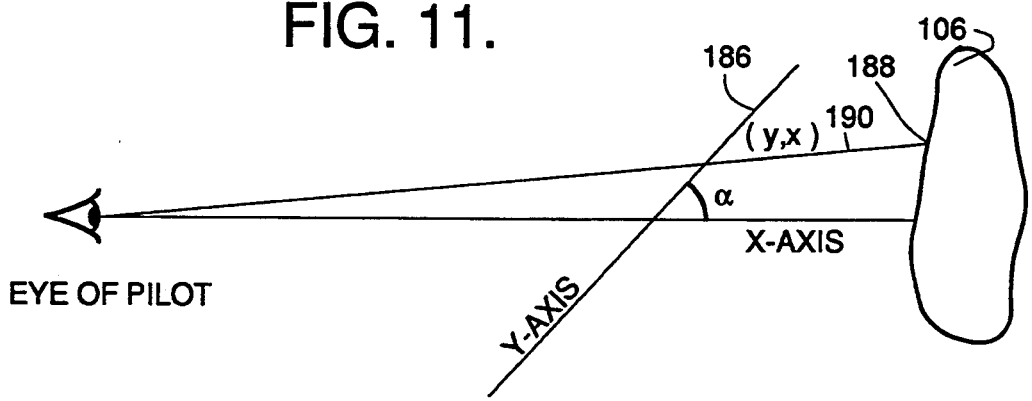

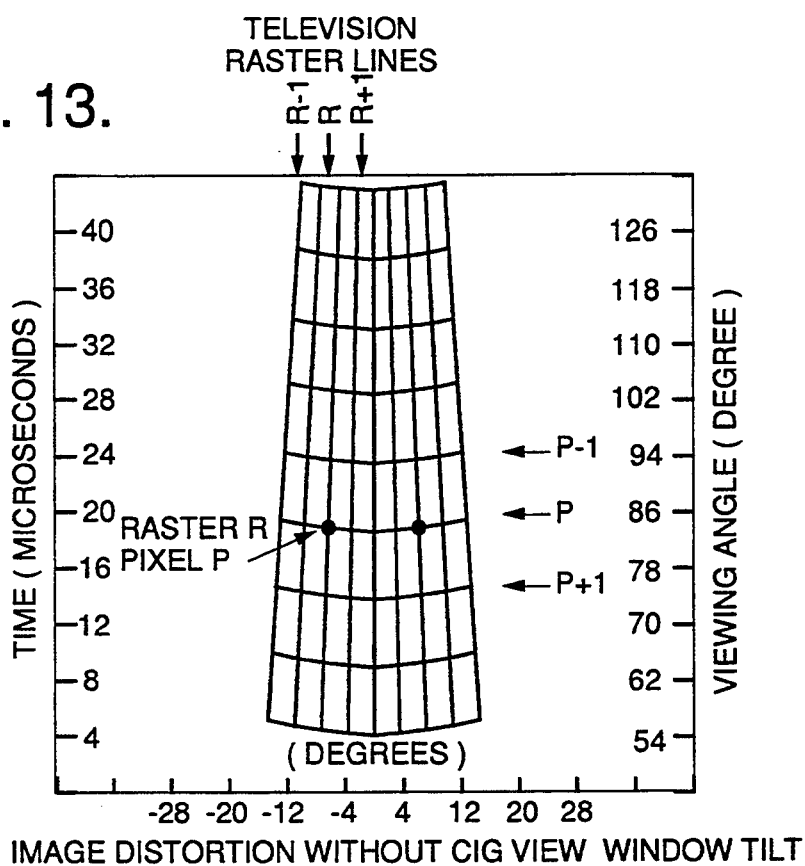
FIG. 13. IMAGE DISTORTION WITHOUT CIG VIEW WINDOW TILT
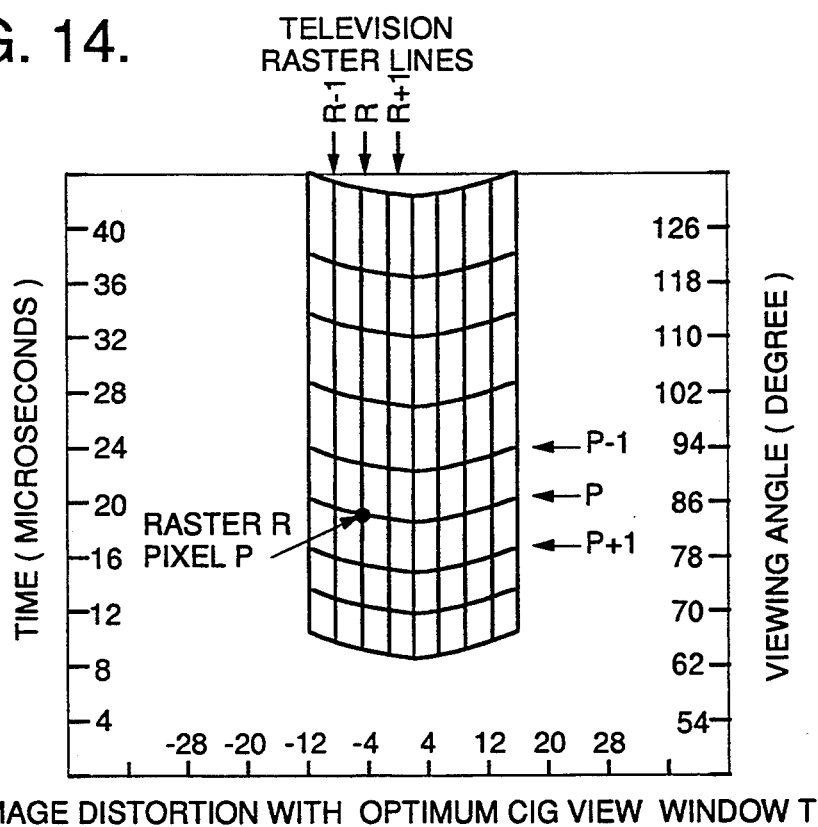
FIG. 14. IMAGE DISTORTION WITH OPTIMUM CIG VIEW WINDOW TILT

IMAGE DISTORTION WITHOUT FAST & SLOW AXIS CORRECTION

IMAGE DISTORTION WITH FAST & SLOW AXIS CORRECTION

DYNAMIC DISTORTION CORRECTION APPARATUS AND METHOD

BACKGROUND OF THE INVENTION

1. Field of the Invention

The present invention relates to image projectors. More specifically, the present invention relates to methods and apparatus for dynamic distortion correction in image projectors.

While the invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

An aircraft simulator is utilized to train pilots to successfully perform air maneuvers. The simulator is designed to emulate actual flight conditions and can be constructed to, for example, position the pilot in a cockpit which is located approximately at the center of a large dome. The dome is typically forty feet in diameter and can include two image projectors. Each projector is designed to project a display image onto the surface of a large dome screen. The first image projector is located outside and at the rear of the dome while the second image projector is located outside but at the front of the dome.

The two projectors are positioned to project television raster images on the forward and rearward hemispherical surfaces, respectively, of the dome. The light from each projector enters through a small hole in the side of the dome which is typically ⅜" or less in diameter. An optical system creates high resolution displays yet the pilot sees minimal light emanating through the hole. Each image projector includes a gimballed mirror which is employed to steer the display image anywhere within the respective hemisphere opposite to the image projector. In general, the display image is constantly moving across the dome surface.

However, a problem exists in that the display image, as seen by the pilot positioned at the center of the dome, becomes increasingly distorted as the viewing angle increases. The viewing angle (V) is defined as that angle between the axis of the image projector through the center of the dome and the line from the center of the dome to the center of the display image on the dome surface screen. These known distortions are caused by the projecton of television images onto a curved screen (e.g., the dome surface screen) from an extreme off-axis projection point. Therefore, in order for a pilot located at the center of the dome to see an undistorted display image regardless of the location of the display image on the dome screen, it is necessary to correct the distortion problem. This type of distortion correction is referred to as dynamic distortion correction.

In the past, dynamic distortion correction was performed in a computer image generator. In general, the computer image generator functioned to provide the source of the display image projected onto the dome surface screen. It is noted that only certain computer image generators, such as the General Electric Compuscene IV, are equipped to perform dynamic distortion correction. Unfortunately, the dynamic distortion correction option, when combined with the other features of the computer image generator, is prohibitively expensive and, therefore, is not a viable option.

Thus, there is a need in the art for an improvement in dynamic distortion correction of the display image at a large viewing angle which is economical and which will permit use of a computer image generator which does not offer the dynamic distortion correction option.

SUMMARY OF THE INVENTION

The need in the art is addressed by the dynamic distortion correction apparatus of the present invention. In an improved aircraft simulator for training pilots, a dynamic distortion correction apparatus for use in an image projector is disclosed. The invention is implemented in a first embodiment having a computer image generator for generating a video image signal. A control circuit processes the video image signal and regulates the clocking rate of a time-delayed video output signal. A modulator is included for converting the video output signal to an optical image signal having a plurality of television raster lines. An optical device is incorporated which orients each of the plurality of raster lines to compensate for distortion in the optical image signal at any viewing angle. Finally, a device is included to control the projection of the optical image signal onto a surface to provide a display image.

In a second embodiment, the optical device is replaced by a correcting mechanism for causing each of the raster lines to be parallel to every other raster line. In a third embodiment, the optical device is replaced by a device for linearly spacing a plurality of pixels along each of the raster lines. Finally, in a fourth embodiment, the optical device is replaced by a galvonometer sweep control to linearly space the plurality of raster lines within the optical image signal.

In a particular implementation, all four embodiments are incorporated into a single embodiment which includes a computer image generator for generating a video image signal. In this embodiment, a control circuit processes the video image signal and regulates the clocking rate of a time-delayed video output signal. A modulator is included for converting the video output signal to an optical image signal having a plurality of television raster lines. Also included is an optical device which orients each of the plurality of raster lines, a correcting mechanism for causing each of the raster lines to be parallel to every other raster line, a device for linearly spacing a plurality of pixels along each of the raster lines, and a galvonometer sweep control to linearly space the plurality of raster lines within the optical image signal. The optical device, correcting mechanism, pixel spacing device, and galvonometer sweep control are included to compensate for distortion in the optical image signal at any viewing angle. Finally, a device is included to control the projection of the optical image signal onto a surface to provide a display image.

BRIEF DESCRIPTION OF THE DRAWINGS

FIG. 1 is an elevational view of an aircraft simulator surrounded by a dome screen showing two target projectors each incorporating the dynamic distortion correction apparatus of the present invention.

FIGS. 7a, 7b and 7c are diagrams showing the development of an initial video modulated beam to a horizontal raster scan line and finally to a two-dimensional display image.

FIG. 10 is a graph illustrating a method of mapping a display image onto the X-Y coordinates of a computation plane in the absence of computer image generator view window tilt compensation.

FIG. 11 is a graph illustrating a method of mapping a display image onto the X-Y coordinates of a computation plane in the presence of computer image generator view window tilt compensation.

FIG. 13 is a graph showing a projected image through a computer image generator view window as it appears when the viewing angle (V) is approximately ninety degrees in the absence of view window tilt compensation.

FIG. 14 is a graph showing the projected image through a computer image generator view window as it appears when the viewing angle (V) is approximately ninety degrees in the presence of view window tilt compensation.

DESCRIPTION OF THE INVENTION

Figure 2A:
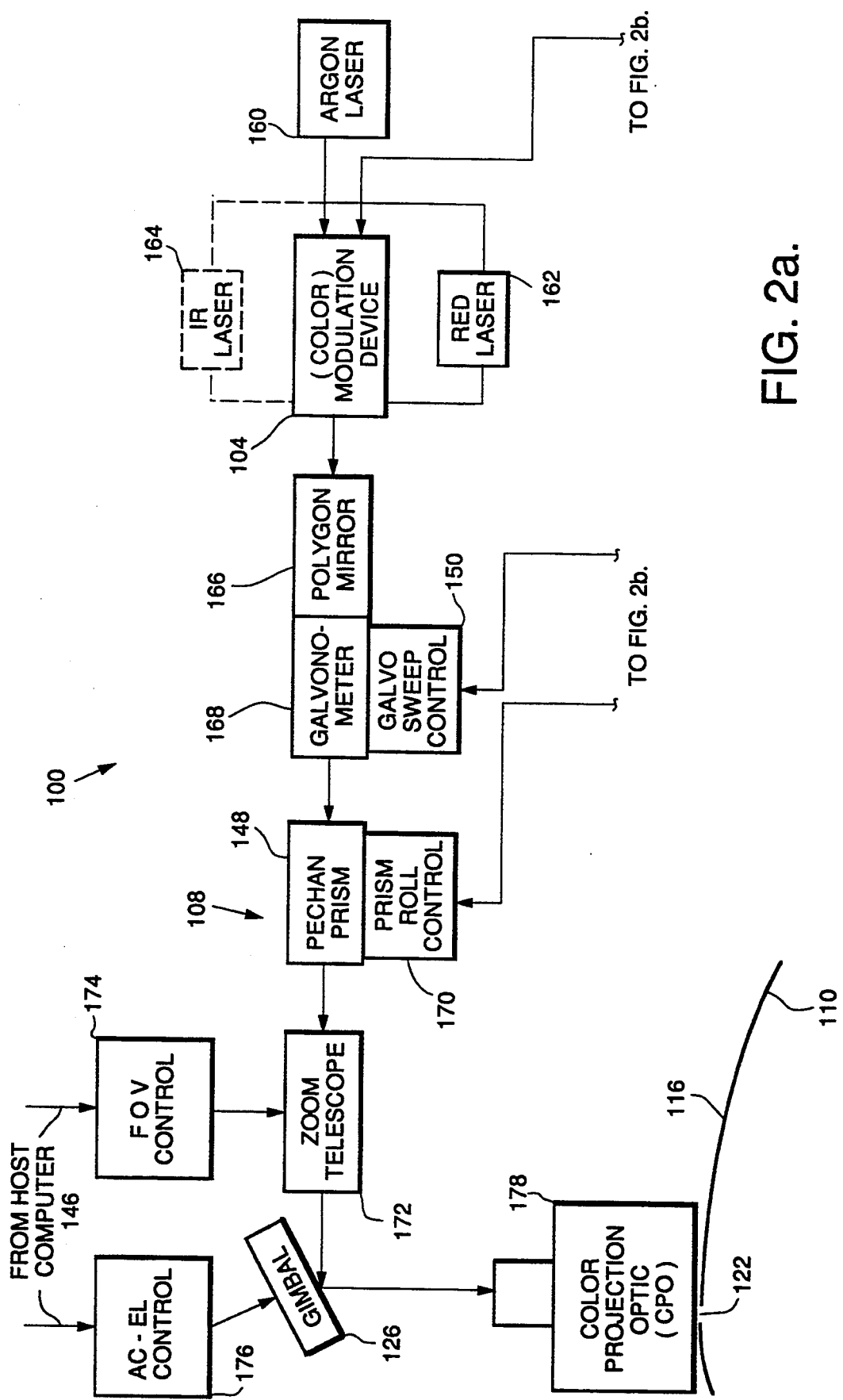
FIG. 2 is a block diagram of the dynamic distortion correction apparatus including a laser control electronics subassembly in accordance with the present invention.

As shown in the drawings for purposes of illustration, the invention is embodied in a dynamic distortion correction apparatus 100 of the type incorporated into an image projector and includes a laser control electronics subassembly 102 which provides a video data output signal to a modulation device 104 which generates a video modulated beam incorporating therein a correction signal for the dynamic distortion in a display image 106 caused by the angle of projection and further includes an optical control subsystem 108 which further processes the video modulated beam for providing a distortion corrected image for projection at any viewing angle (V) onto a dome surface screen 110.

An aircraft simulator 112, as shown in FIG. 1, is utilized to train pilots to successfully perform air maneuvers under normal and emergency conditions. The simulator 112 usually includes a cockpit 114 which can be, for example, located approximately at the center of a large dome 116. A pair of projectors 118 and 120 are positioned outside of the dome 116 for projecting the display image 106 through a small opening 122 formed in the dome. The projectors, usually mounted at the front and rear of the dome 116, project television raster images on the rear and front hemispheres, respectively, of the dome surface screen 110. A gimballed mirror 126 (shown in FIG. 2) included in each projector 118, 120 steers the display image 106 anywhere within the respective hemisphere. However, as seen by the pilot at the center of the dome 116, the display image 106 becomes increasingly distorted as the viewing angle (V) increases.

For the purpose of simplifying the discussion, the viewing angle (V) will be illustrated with reference to the rear image projector 120. However, the same principles are equally applicable to the front image projector 118. The viewing angle (V) is defined as the angle between the axis of image projector 120 through the center of the dome 116 and the line from the center of the dome to the center of the display image 106 projected onto the dome screen 110. Consider the display image 106 created by the rear projector 120 which is assumed to be located 180 degrees in azimuth from the rear projector and at, for example, −25 degrees elevation. At a viewing angle (V) equal to zero degrees, the display image 106 is undistorted as shown in FIG. 1. However, the display image becomes increasingly distorted as the viewing angle (V) is increased.

At a viewing angle (V) equal to 90 degrees, the normally undistorted aspect ratio (width/height) of 1:1 becomes approximately 3.2:1 causing the display to shrink in one dimension and to stretch in the other dimension. This change in aspect ratio of the display image 106 would be very disturbing if it occurred during a training flight in the aircraft simulator 112. Under such conditions, the pilot of the aircraft simulator might be unable to successfully perform air maneuvers. This is true because the apparent range and attitude of the display image 106 would be affected by the distortion and would change depending upon where the display image appeared on the dome surface screen 110.

The pilot is located within the cockpit 114 which is enclosed by a plexiglass canopy 130 as shown in FIG. 1. The pilot can enter the canopy by climbing a ladder or stairwell 132 to a platform structure 134. Located within the canopy is an instrumentation panel (not shown) utilized by the pilot during training exercises. The rear image projector 120 is positioned at an elevation angle to permit the projected display image 106 to pass over the top of the canopy 130. The 25 degree elevation angle of projector 120 is provided for illustration purposes only. Other elevation angles are suitable under different conditions. Various other angles are shown in FIG. 1 for exemplary purposes and include the maximum projection angle, the field of view angle (F) of the display image 106, and the elevation angle of the front image projector 118. The maximum projection angle is shown as 56 degrees but can be any of a plurality of other suitable values. The field of view angle (F) of the display image 106 is shown as 6.9 degrees, however, an acceptable range is from (4–40) degrees. Finally, the front image projector 118 is shown, for exemplary purposes only, with an elevation angle of 14 degrees.

In accordance with the present invention, a variable frequency oscillator 140 of the laser control electronics subassembly 102 controls the output rate of a video data output signal from a buffer 142 while the laser control electronics subassembly 102 and the modulation device 104 cooperate to provide a video modulated beam which represents a signal having distortion equal and opposite to the distortion in the display image 106 caused by the angle of projection onto the dome surface screen 110. The optical control subassembly 108 further processes the video modulated beam for providing a distortion corrected display image. By employing the dynamic distortion correction apparatus 100, the display image projected onto the dome surface screen 110 remains undistorted regardless of where the display image 106 appears on the dome screen which permits the use of a less expensive computer image generator 144 that is not equipped with a dynamic distortion correction option.

Figure 2B:
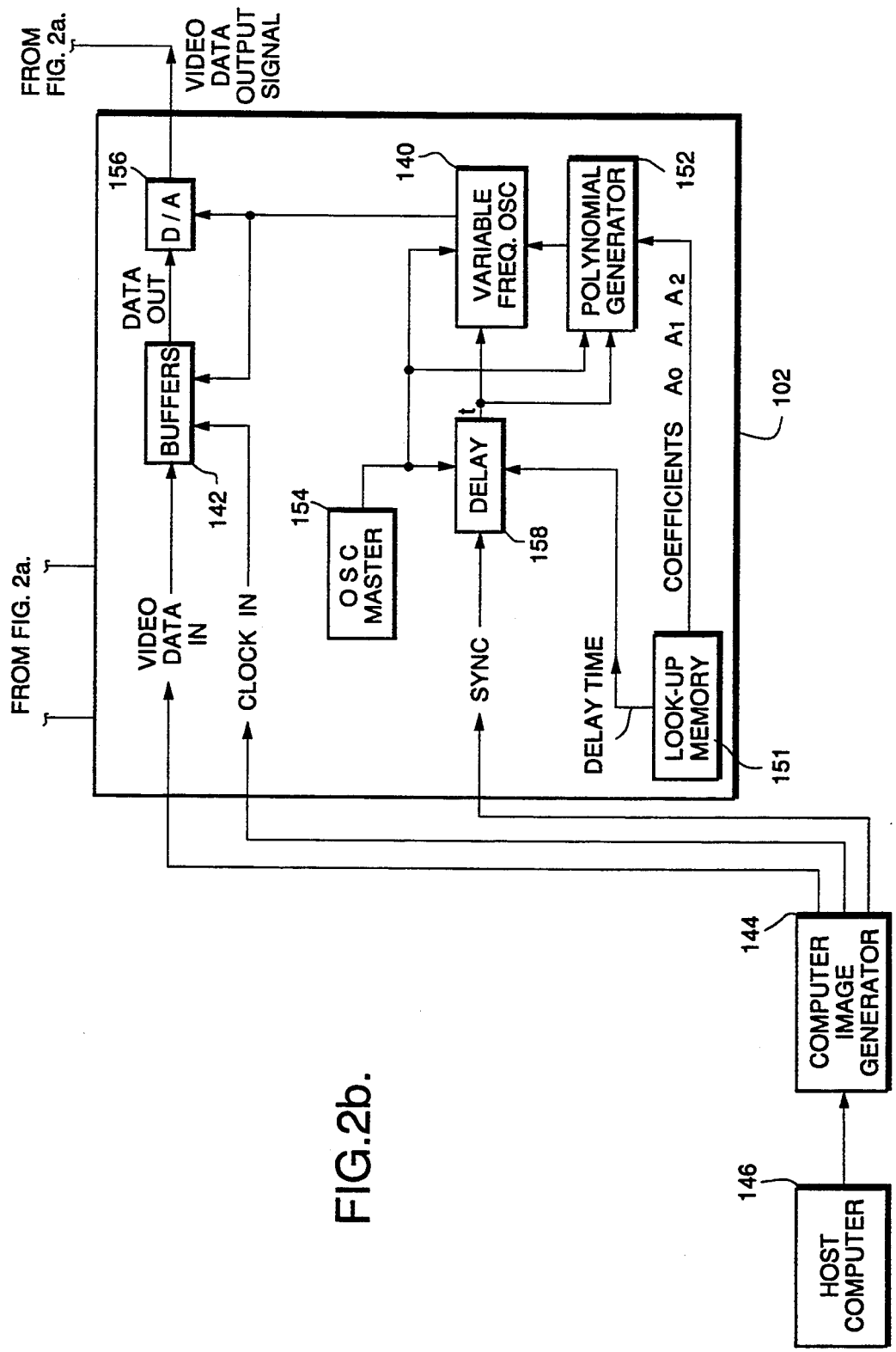

Each of the elements in the aircraft simulator 112 are controlled by a host computer 146 as shown in FIG. 2. In particular, the host computer 146 determines the position of the aircraft simulator 112 and the display image 106 projected onto the dome screen 110. This is accomplished by providing the host computer with data to calculate the respective positions of the simulator and the display image including three dimensional coordinates (x, y, z) and angular measurements of roll, pitch and yaw. The data provided to the host computer 146 includes information on the throttle setting and control surface settings (aileron, rudder, etc.) of both the aircraft simulator 112 and the aircraft that is represented by the projected display image 106. The projected display image 106 is generally controlled from another instrumentation panel (not shown) by an instructor or by a computerized program designed for this purpose.

The host computer 146 then determines and solves the equations of motion for the aircraft simulator 112 and the aircraft represented by the display image 106. From these calculations, the position of the display image with respect to the nose of the aircraft simulator is constantly updated in the host computer 146. Further, the host computer 146 continually provides updated information to the computer image generator 144 which computes the display image 106. Thereafter, the host computer transmits signals to the computer image generator 144 for guiding the gimballed mirror 126. This information is updated sixty times a second and permits the gimballed mirror to direct the display image onto the dome screen 110.

In general, when the display image 106 is projected onto the dome screen 110, the image is distorted, as viewed by the pilot, as the viewing angle (V) increases. The viewing angle (V) changes as the display image 106 moves across the dome screen. In order to counteract the distortion caused by the projection angle, a combination of four techniques are utilized simultaneously to present an undistorted display image 106 anywhere on the dome surface screen 110. These techniques include the use of the symmetry of the dome 116, tilting of the computational plane or view window of the computer image generator 144, correcting the non-linear pixel spacing along each raster line, and adjusting the spacing between each raster line. These techniques are respectively accomplished in a Pechan prism 148, the computer image generator 144, the laser control electronics subassembly 102, and a Galvonometer sweep control 150. Each technique will be discussed and illustrated after a general discussion of the block diagram shown in FIG. 2.

The host computer 146 calculates the appropriate viewing angle (V) and the field of view angle (F) of the projected display image 106 and transmits the information to the laser control electronics subassembly 102. The appropriate viewing angle (V) and field of view angle (F) of the display image are determined during the calculations of the equations of motion of the aircraft simulator 112 and the aircraft represented by the display image 106. The electronics subassembly 102 precomputes coefficients ($A_0$, $A_1$, $A_2$, . . . , $A_n$) for every possible integer combination of the viewing angle (V) and the field of view angle (F) for describing the desired frequency versus time profile. Each of the possible integer combinations are then stored in a look-up memory 151 within the electronics subassembly 102. The look-up memory 151 can be, for example, a programmable read-only memory. Upon receiving an integer combination of viewing angle (V) and field of view angle (F), the look-up memory 151 provides the precomputed coefficients to a polynomial generator 152. For non-integer combinations of viewing angle (V) and field of view angle (F), e.g., V=1.3 degrees, F=2.7 degrees, the proper coefficients are determined by interpolation and provided to the polynomial generator 152.

Figure 3:
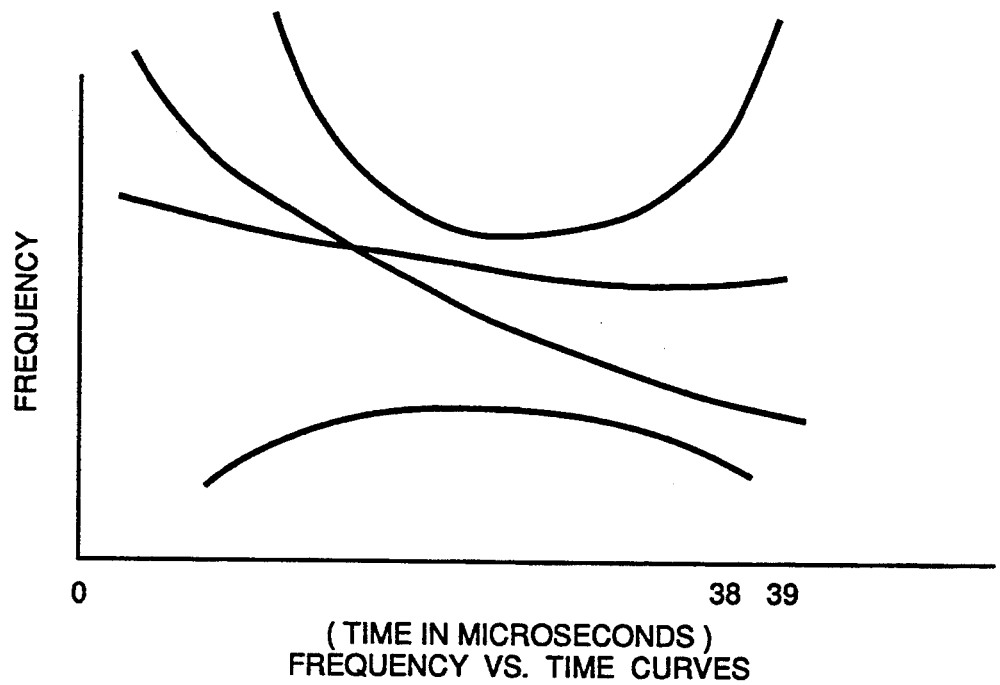
FIG. 3 is a graph illustrating various frequency versus time curves produced by a polynomial generator of the laser control electronics subassembly of FIG. 2.

Each different set of precomputed coefficients causes the polynominal generator 152 to produce a distinct polynomial for a distinct oscillation frequency. Therefore, a plurality of coefficient sets ($A_0$, $A_1$, . . . , $A_n$) provided by the polynomial generator permits the generation of a corresponding plurality of frequency versus time curves as shown on FIG. 3. Four representative frequency versus time curves are shown. Thus, with a particular set of coefficients, it is possible to obtain any desired frequency versus time curve. It is noted that there are three variables associated with each of the curves shown in FIG. 3. Those variables are the viewing angle (V), the field of view angle (F) and the raster line number. There are more than eight-hundred raster lines per viewing window with each raster line having a different frequency versus time curve. As will be described in conjunction with the technique for tilting the view window of the computer image generator 144, each raster line is distorted differently from the neighbor raster line. Thus, the coefficients ($A_0$, $A_1$, . . . , $A_n$) for each raster line are precalculated and stored in the programmable read-only memory look-up table 151 in the electronics subassembly 102. The polynomial generator 152 continually provides a signal, which changes at the rate of approximately 5.4 million times a second, to the variable frequency oscillator 140. The oscillator 140 provides a time varying frequency signal which changes in accordance with the polynomial generator signal.

The precomputed coefficients ($A_0, A_1, \ldots, A_n$) can be any series representation of the oscillator frequency versus time such as a Taylor series. However, it has been determined that a Chebyshev series provides the least amount of absolute error at any location on the display image 106. It is a well known characteristic of a Chebyshev series that the error is uniformly distributed over the defined interval. In order to reduce real time computing requirements, the Chebyshev coefficients are calculated off-line for each integer value of viewing angle (V) and field of view angle (F). Further, the Chebyshev coefficients are interpolated in real time for fractional values of viewing angle (V) and field of view angle (F).

Figure 4:
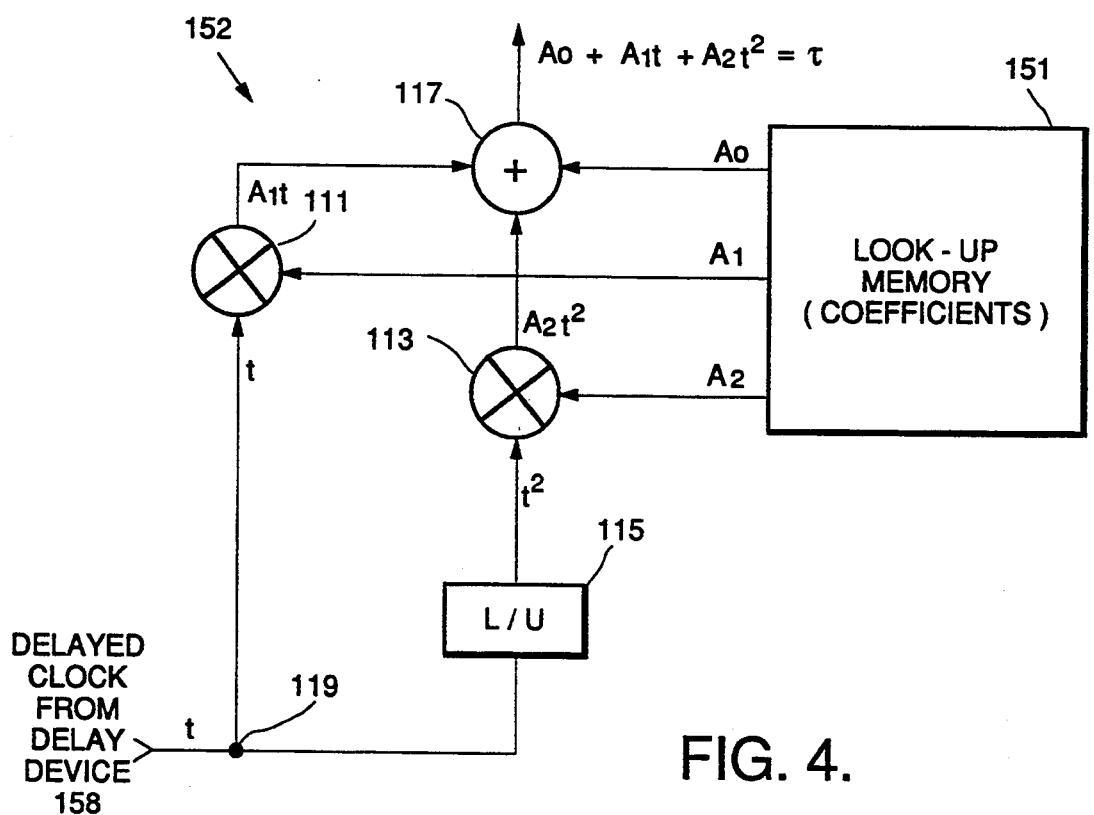
FIG. 4 is a block diagram of a polynomial generator showing the components which generate a polynomial for transmission to a variable frequency oscillator.

The polynomial generator 152 is shown in FIG. 4 and includes a pair of 32 bit-by-32 bit floating point multipliers 111 and 113, a look-up memory device 115, and a summer circuit 117. The delayed clock signal (t) is transmitted to the polynomial generator 152 from a delay device 158. After reaching a node 119, the delayed clock signal is transmitted to multiplier 111 and to the memory device 115. The memory device 115 of the polynomial generator 152 provides an output signal which is the square of the input delayed clock signal (t). Simultaneously, the look-up memory 151 of the electronics subassembly 102 provides coefficient $A_0$ to the summer circuit 117, coefficient $A_1$ to multiplier 111 and coefficient $A_2$ to multiplier 113. The output of multiple 111 is the term $A_1 t$ while the output of multiplier 113 is the term $A_2 t^2$. Each of these terms are summed along with the coefficient $A_0$ in the summer circuit 117 to generate the following function which is provided to the variable frequency oscillator 140.

$$\tau = A_0 + A_1 t + A_2 t^2 + \ldots + A_n t^n \quad [1]$$

The polynomial generator 152 defines the spacing of pixels in one raster line. The independent variable of the polynomial equation [1] is time. However, this time is relative to the starting edge of the raster line. The delayed clock input to the polynomial generator indicates that zero time starts with the first pixel which is delayed. The output of the polynomial generator or period ($\tau$) disclosed in equation [1] is equal to the time between pixels and is defined in units of "clocks" from the master oscillator 154.

A master oscillator 154 is the source of the highest frequency signal utilized in the laser control electronics subassembly 102. The function of the oscillator 154 is to generate a clock pulse with a continuous series of electrical pulses for synchronizing the digital electronics subassembly 102. The fixed frequency master oscillator 154 generates an 8-phase clock and then the clock number and phase are selected for each pixel for clocking the pixel to the next digital phase. Binary bits are transferred from one location to another location within the electronics subassembly 102 when the clock pulse changes polarity. Mathematical manipulation of the binary bits also occurs when the clock pulse changes polarity. In the present invention, the master oscillator operates at 87 MHz (11 nanosecond period) and therefore the 8-tap delay lines provides a tap every 1.5 nanosecond. Thus, the clock pulse operates at eight times the selected oscillator frequency of 87 MHz, e.g., 700 MHz.

In correcting for distortion, the display image 106 must be shifted. A technique of shifting the display image without moving the gimballed mirror 126 is to delay reading out the contents of a digital-to-analog (D/A) converter 156. This technique corrects for non-linear pixel spacing along each raster line of the television video data input to the buffer 142 as described hereinbelow. A predistorted raster is not rectangular since the starting edge of the raster is curved. In order to generate this curvature, the first pixel of each raster line must be output at a different point in time relative to a sync signal. This delay technique is achieved by the delay device 158 located within the electronics subassembly 102 of FIG. 2. The delay device 158 is a binary counter and compare circuit that counts clock pulses from the master oscillator 154 to determine when to initiate the variable frequency oscillator 140. The delay device 158 receives delay time signals stored in the look-up memory 151 of the electronics subassembly 102. The delay time signals are transmitted from the look-up memory 151 to the delay device 158 on a delay time line as shown in FIG. 2.

The output of the D/A converter 156 is the video data output signal which forms the display image 106. The technique of delaying the reading of the D/A converter 156 actually delays the operation of the variable frequency oscillator 140 which, in turn, delays clocking the buffer 142. A delay in clocking the buffer 142 delays the transmission of the digital data signal to the D/A converter 156 and delays the passing of the video data output signal to the modulation device 104. The sync signal originates with the host computer 146 and is sent to the computer image generator 144. The sync signal is then transmitted from the computer image generator to each component in the electronics subassembly 102 and is designed to keep each component in synchronism. In particular, the frequency of the variable frequency oscillator 140 is controlled via the horizontal and vertical sync signals received from the computer image generator.

At any instant of time, the computer image generator 144 provides one line of a television video signal which is digitized and stored in the buffer 142. The television video signal is clocked into the buffer 142 by the clock signal provided by the computer image generator. The variable frequency oscillator 140 then clocks the digital data out of the buffer 142 and directs it to the D/A converter 156 as shown in FIG. 2. The clocking rate of the variable frequency oscillator 140 is controlled by the sync signal transmitted from the computer image generator 144. Considering the type of image projector 118, 120 utilized, the number of frames per second, the interlace ratio parameter and the number of raster lines, the clocking rate of the buffer 142 can be approximately 26,250 raster lines per second. Thus, correction must be made for this number of raster lines as will be described hereinbelow. The digitized television signal is then converted back into an analog television video signal in the D/A converter 156. Thereafter, the video data output signal is fed to the modulation device 104 which can comprise, for example, an acousto-optic modulator. In the actual implementation, at least two buffers are needed so that the video signal of raster line (R+1) can be written into the second buffer while the video signal of raster line (R) is simultaneously read out of the first buffer.

Figure 5:
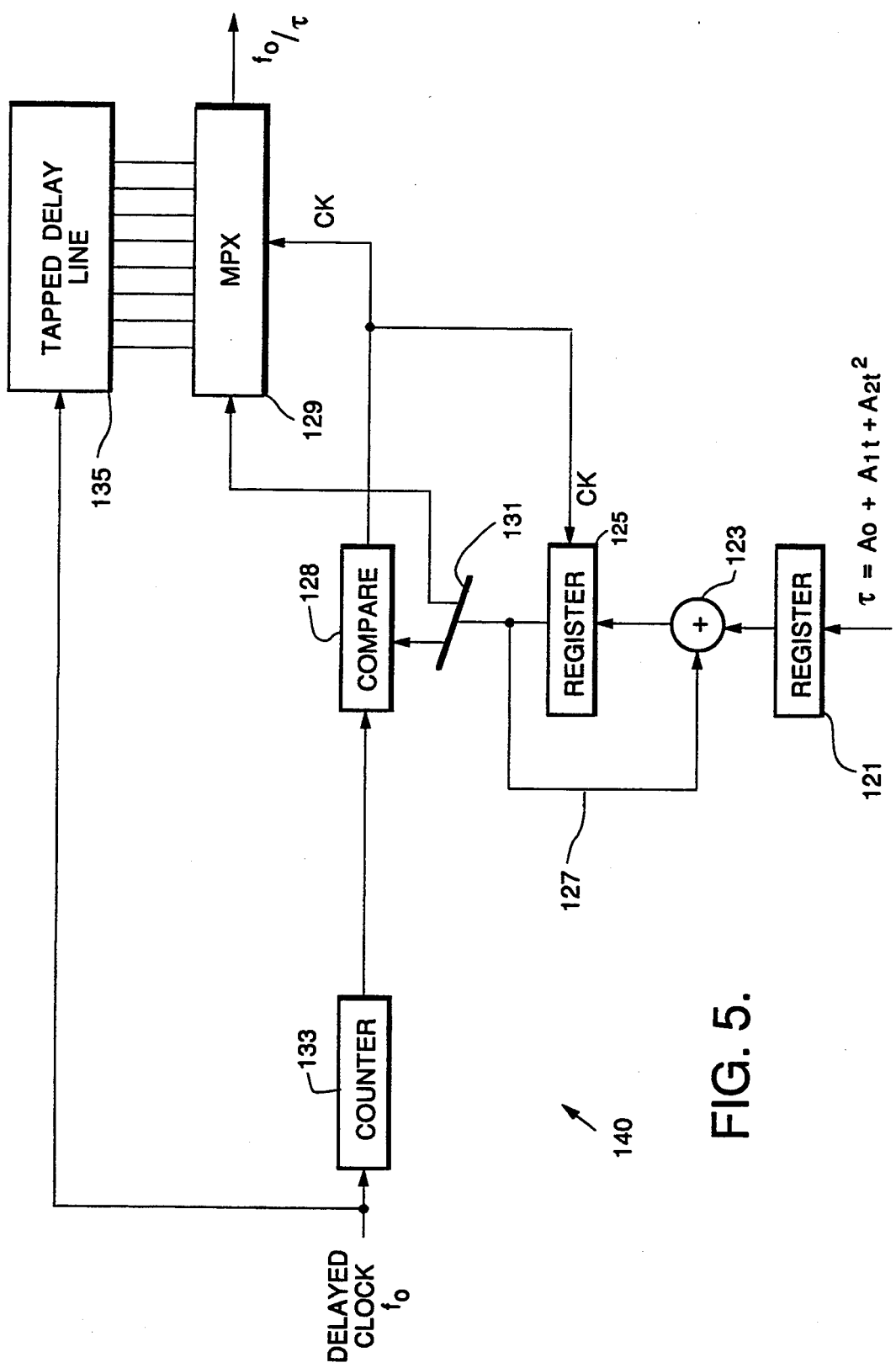
FIG. 5 is a block diagram of a variable frequency oscillator showing the components which provide a delayed clock signal for clocking digital data out of a buffer and to a digital-to-analog converter.

The digital period $\tau$ transmitted from the polynomial generator 152 is received by a first register 121 of the variable frequency oscillator 140 as shown in FIG. 5. The variable frequency oscillator 140 functions as a variable pixel clock as explained hereinbelow. The first register reads out the stored digital period $\tau$ to a summer circuit 123. The summer circuit 123 also receives the clocked output of a second register 125 via a feedback loop 127. Thus, the output of the summer circuit 123 is the combined outputs of the first and second registers 121 and 125. The output of the second register 125 is transmitted to both a compare circuit 128 and to a multiplexer 129 from a junction device 131. The delayed clock has the base frequency ($f_0$) and is shown in FIG. 5. The delayed clock is the master clock transmitted from the master oscillator 154 and referenced to "delayed time zero" as in the polynomial generator 152 shown in FIG. 4. The delayed clock ($f_0$) is transmitted to a counter 133 and to a tapped delay line 135. The tapped delay line 135 is connected to the multiplexer 129 via a plurality of lines.

The pulses of the delayed clock ($f_0$) are counted by the counter 133 and thereafter transmitted to the compare circuit 128 for comparison with the output of the second register 125. The output of the compare circuit 128 functions to clock both the multiplexer 129 and the second register 125. Clocking of the second register 125 enables the feedback loop 127 and the compare circuit 128. Further, clocking of the multiplexer 129 permits the entry and processing of the input signals thereto. The units of the period ($\tau$) are normalized to the basic frequency of the master oscillator 154. Thus, the output frequency of the variable frequency oscillator 140 is computed by dividing the base frequency ($f_0$) by tau ($\tau$) as indicated below.

$$\text{Output frequency} = [(f_0)/\tau] \quad [2]$$

The command input to the variable frequency oscillator 140 is the period ($\tau$), not the frequency. The variable frequency oscillator 140 functions by calculating the time for the next output clock edge by adding the period ($\tau$) to the last clock edge. The period is expressed as a binary number and since the period ($\tau$) is normalized, the units of the period ($\tau$) are those of the master oscillator 154. Thus, the output frequency is equal to the input frequency divided by the period ($\tau$) which is a binary number.

Figure 6:
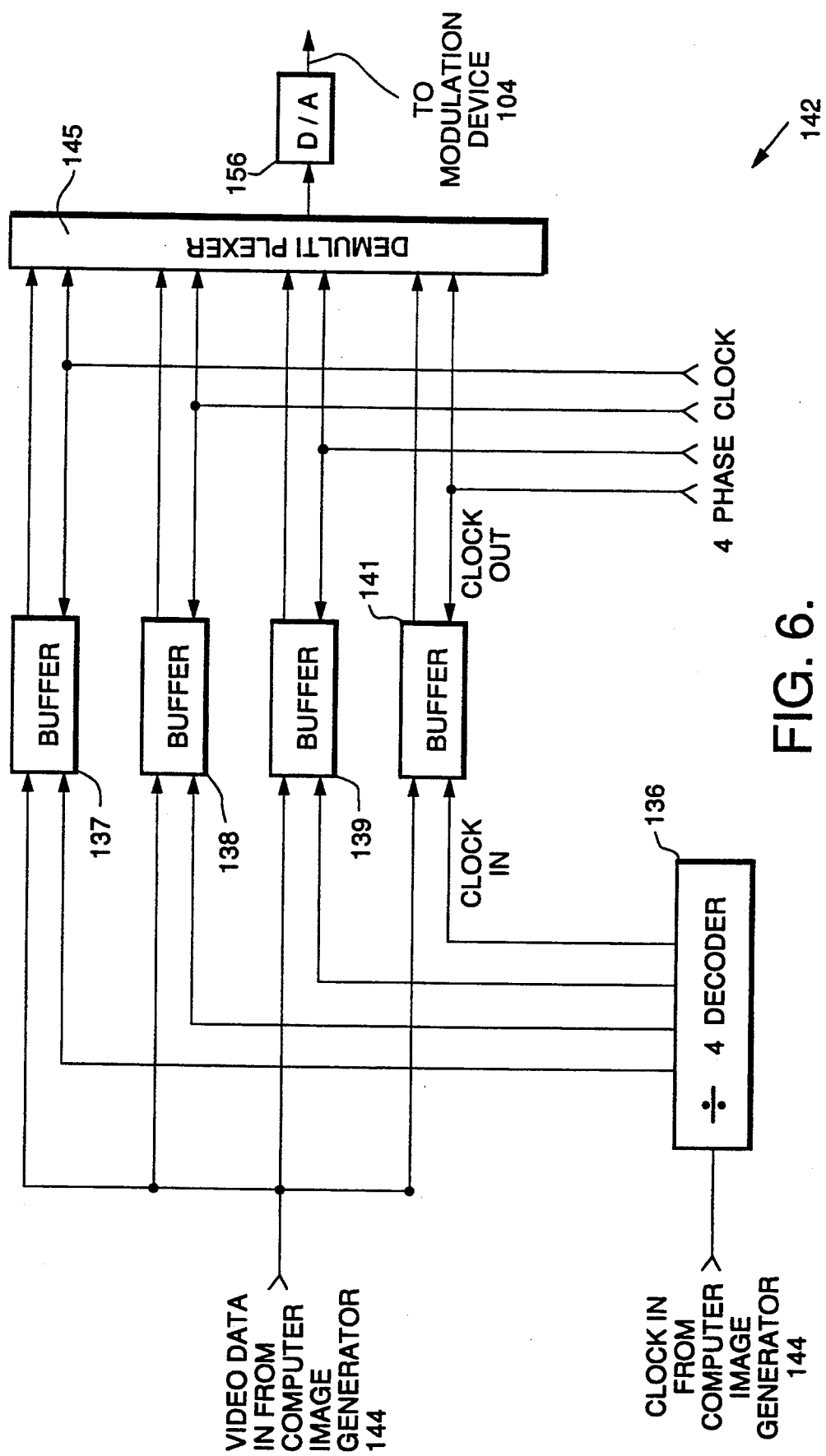
FIG. 6 is a block diagram of a buffer utilized to temporarily store digital data transmitted from a computer image generator to a digital-to-analog converter and the clocking scheme associated therewith.

A block diagram of the buffer 142 is shown in FIG. 6. Included therein is a divide-by-four decoder 136, four sub-buffers identified by the numerals 137, 138, 139 and 141, and a demultiplexer 145. The output of the demultiplexer 145 is directed to the D/A converter 156. The video input signal from the computer image generator 44 is directed to and stored in each of the four subbuffers 137, 138, 139 and 141. Further, the clock-in signal supplied by the computer image generator 144 is transmitted to the divide-by-four decoder 136. The decoder 136 utilized in the clock-in circuitry is also connected to each of the four sub-buffers 137, 138, 139 and 141 for clocking the video input signal therein. Likewise, each of the four sub-buffers are connected to the demultiplexer 145. A four-phase clock input associated with the clock-out circuitry is transmitted from the variable frequency oscillator 140 to each of the subbuffers and to the demultiplexer 145.

In operation, the buffer 142 receives nine-hundred and sixty pixels at a constant rate and clocks these pixels into the D/A converter 156 at a variable rate after a delay. The variable rate is defined by equation [2]. The maximum design frequency rate is 87 MHz. The design objective is to clock each pixel within $\frac{1}{4}$ pixel of the correct time for that clocked pixel with a maximum error of $\frac{1}{2}$ pixel. The input pixels are sequenced to the four sub-buffers 137, 138, 139 and 141. Use of the four sub-buffers permits the buffer 142 to work at only one-fourth the speed. The input pixels remain stored in the sub-buffers until they are clocked out by the four-phase clock from the variable frequency oscillator 140. The output signal ($f_0$)/$\tau$ is distributed into four branches to form the four-phase clock for convenient distribution to each of the sub-buffers and to the demultiplexer 145. When the four-phase clock is received at each sub-buffer, the input pixels are clocked out to the demultiplexer and then to the D/A converter 156. Thus, the sub-buffers must cycle at a maximum rate of only 22 MHz. Only the demultiplexer 145 and the D/A converter 156 are required to operate at the maximum rate of 87 MHz.

The projection of the display image 106 onto the dome screen 110 includes distortion which is caused by an extreme off-axis projection angle. The video data output signal transmitted from the D/A converter 156 to the modulation device 104 is an analog signal. The video data output signal includes a distortion that is designed to be opposite to the distortion which will appear in the projected display image 106 as a result of the projection angle. For example, if the display image 106 is bowed outward, then the distortion designed to be opposite to the projection angle distortion will cause the display image to bow inward by an equivalent amount. The net effect is that the distortion in the display image 106 caused by the projection angle is minimized. This technique which corrects for the non-linear pixel spacing along each raster line is just one of the four correction techniques to be discussed in more detail hereinbelow.

Each of the image projectors 118 and 120 can be, for example, laser projectors and thus a light source 160 employed in the present invention can typically be an Argon ion laser. The wavelength of the light source 160 is within the range of (400-to-1000) nanometers. The display image 106 is projected in color. Thus, the light source 160 provides the necessary green and blue colors and also provides the pump beam for a red dye laser 162 and a near infrared laser(s) 164, if one is fitted. Both the red dye laser 162 and the near infrared laser 164 (if fitted) are connected to the modulation device 104 to provide color modulation. Each color beam is separately modulated at video frequencies using standard acousto-optic modulators located within the modulation device 104.

The argon light of the light source 160 is modulated within the modulation device 104 by the video data output signal transmitted from the D/A converter 156. Thus, the video modulated red, green, and blue beams and the near infrared beams (if any) are combined into a single beam in the modulation device 104. Therefore, the video data output signal which is a voltage is converted to a light in the modulation device 104 to provide a single video modulated beam. The video modulated beam is utilized as a spot of light to generate the display image as shown in FIG. 7a. The video modulated beam is then transmitted to a spinning polygon mirror surface 166 and a galvonometer 168 to provide a two-dimensional display. The video modulated beam is first reflected from the spinning polygon mirror surface 166 to provide a fast horizontal raster line scan as shown in FIG. 7b. The fast horizontal scan moves the raster line along the horizontal direction similar to that occurring on a television screen.

The galvonometer 168 rotates a shaft and a mirror mounted to the shaft (not shown). The mirror mounted on the galvonometer 168 is oriented orthogonal to the polygon mirror surface 166. The video modulated beam is then reflected from the mirror mounted on the galvonometer 168 to provide a slow vertical raster line scan. The output signal of the galvonometer 168 is the display image 106 in two dimensions as shown in FIG. 7c. The terms, horizontal and vertical, refer to the television convention and should not be construed to mean horizontal and vertical in the display image 106 projected onto the dome screen 110.

In a manner analogous to the correction of non-linear pixel spacing along each raster line in the electronics subassembly 102 (described in more detail hereinbelow), similar control circuits and Chebyshev coefficients control the sweep of the galvonometer 168. The galvonometer sweep control 150 receives a control signal from the laser control electronics subassembly 102. The control signal originates in the host computer 146. Based upon the inputs from the simulator 112 and the aircraft (not shown) represented by the display image 106, the host computer 146 computes the angular distance that the galvonometer shaft must move (or sweep) to properly position the galvonometer mirror. The shaft is then rotated to control movement of the galvonometer mirror. The result is that the raster line spacing is uniform and correct as seen by the pilot located at the center of the dome 116.

Next, the Pechan prism 148, an image rotation device, performs a rotation of the two-dimensional display image 106. The image rotation causes the raster lines of the display image to always be parallel to the long dimension of the display image. This optical correction technique of minimizing distortion in the display image is further discussed with reference to use of dome symmetry hereinbelow. A prism roll control device 170, which also receives a control signal from the electronics subassembly 102, functions to control the optical image rotation of the display image 106. The output of the pechan prism 148 is the display image 106 which is optically corrected and includes only three variables. Those variables include the viewing angle (V), the field of view angle (F) and the raster line number. Because of the distortion correction based on symmetry of the dome 116, azimuth and elevation angle have been eliminated as variables.

The display image 106 is then transmitted to a zoom telescope 172 for obtaining the require field of view angle (F). The zoom telescope 172 is controlled by a field of view control device 174 which receives a control signal from the host computer 146. Since the host computer 146 continuously calculates the position of the simulator 112 and the aircraft represented by the display image 106 based on available data, the required position of the image display is always known. This position information is then transmitted to the field of view control 174 and to an azimuth-elevation control device 176 for adjusting the field of view angle (F) of the zoom telescope 172 and for providing the proper azimuth and elevation angles of the display image 106 on the dome screen 110, respectively.

The output signal from the zoom telescope 172 is the display image with a corrected field of view angle (F). The telescope output signal is then transmitted to the gimballed mirror 126. The gimballed mirror 126 is controlled by the azimuth-elevation control device 176 which utilizes the received position information from the host computer 146 to direct the movement of the gimballed mirror 126 to the proper azimuth and elevation angles. The gimballed mirror 126 is then repositioned to reflect the display image 106 to a color projection optic device 178. The angular magnification of the color projection optic device 178 is approximately twelve. Merely tilting the gimballed mirror 126 by ±9 degrees permits directing the display image 106 anywhere in the forward hemisphere (when utilizing the rear image projector 120). The color projection optic device 178 is an optical system employed for focusing the display image 106 through the small opening 122 in the side of the dome 116 and onto the forward hemisphere of the dome screen 110. It is noted that at least two projectors are necessary to project the display image 106 over the entire 360 degree spherical dome surface screen 110.

Figure 8:
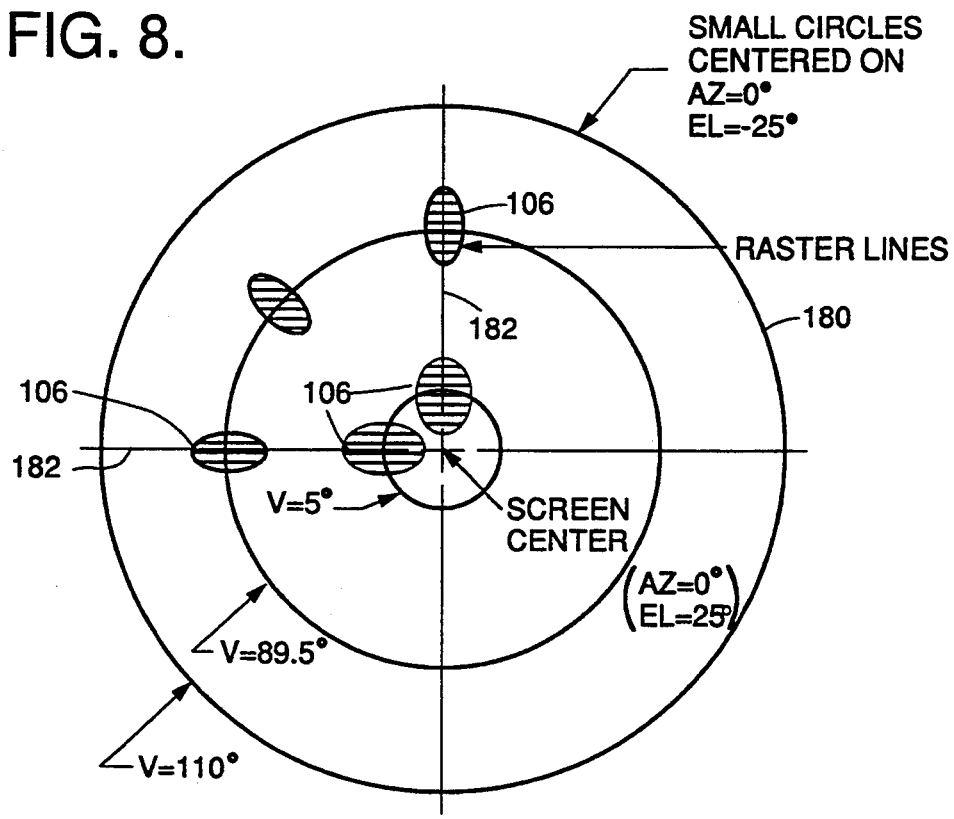
FIG. 8 is a graph illustrating the target projector scan line orientation relative to the center of the dome screen of FIG. 1 before image rotation compensation.

In order to correct the distortion in the display image 106 projected onto the dome screen 110, each of the four simultaneously employed techniques will now be described. The first technique involves the use of the symmetry of the dome 116. It is known that the locus of constant viewing angle (V) is a small circle and that the distortion is the same at all locations on the small circle. The orientation of television raster lines in the absence of image rotation compensation is shown in FIG. 8. Three small concentric circles 180 are shown for representing the viewing angle (V) at 5 degrees, 89.5 degrees and 110 degrees. The center of the dome screen 110 is represented to be at an elevation angle of −25 degrees and an azimuth angle of zero degrees. Note that the circular display is distorted to approximately an elliptical shape.

Figure 9:
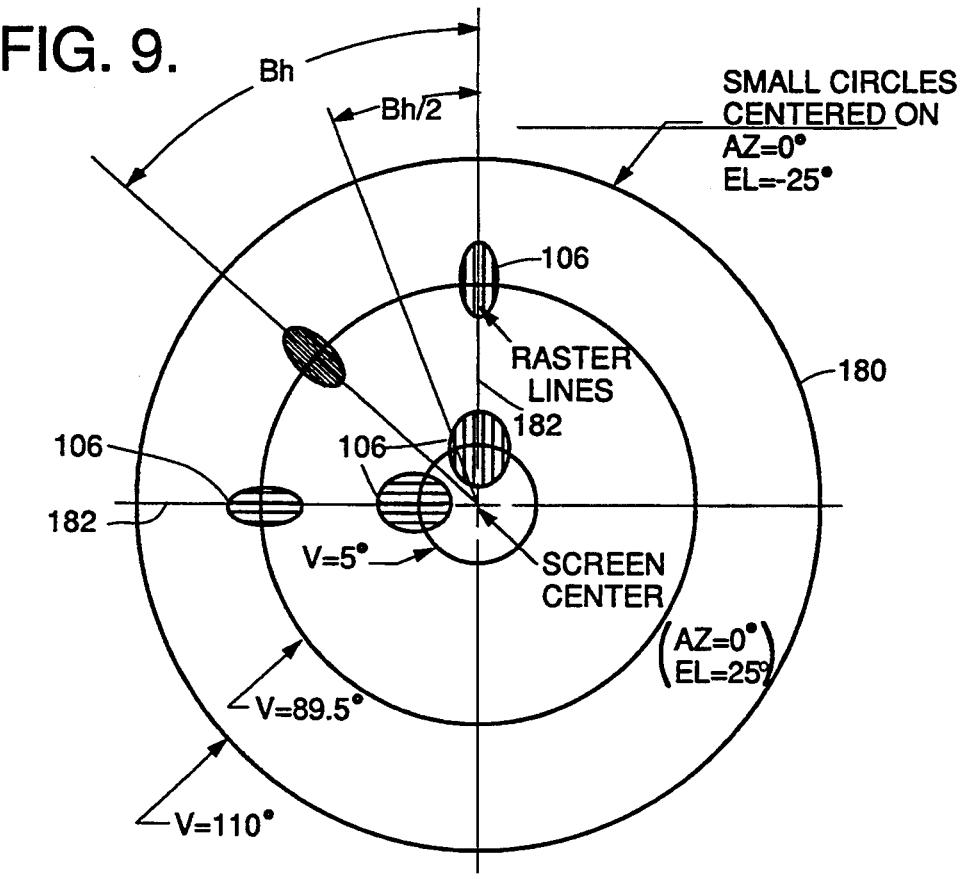
FIG. 9 is a graph illustrating the target projector scan line orientation relative to the center of the dome screen of FIG. 1 after image rotation compensation.

At the top of the small circles 180, the raster lines are perpendicular to the long dimension 182 of the elliptical-shaped display image 106. However, at the side of the small circles 180, the raster lines are parallel to the long dimension 182 of the elliptical-shaped display image 106 as shown in FIG. 8. Incorporation of the image rotation device, the Pechan prism 148, into the image projector 120 causes the raster lines to always be parallel to the long dimension 182 of the elliptical-shaped display image 106 as shown in FIG. 9. Thus, the raster lines are always perpendicular to the locus of the small circles 180. The Pechan prism rotates the display image 106 through an angle. The Pechan prism angle is exactly one-half the angle ($B_h$) as shown in FIG. 9, or ($B_h$)/2. For example, if the display image 106 was at the top of any of the small circles 180, then angle ($B_h$) would equal zero and the Pechan prism angle ($B_h$)/2 would also equal zero. If the display image 106 was at the far left of any of the small circles 180, then ($B_h$) would equal 90 degrees (or 270 degrees) and the Pechan prism angle ($B_h$)/2 would equal 45 degrees (or 135 degrees). FIG. 9 shows the angle ($B_h$) at approximately 45 degrees (or 225 degrees) so that the Pechan prism angle ($B_h$)/2 is 22.5 degrees (or 112.5 degrees).

The significance of this is that display image distortion is no longer a function of azimuth and elevation angles but merely a function of viewing angle (V). This is true because in the presence of image rotation compensation, all displays appear the same for any viewing angle (V). When the display image 106 is oriented with respect to the projection axis, the computation and computer memory requirements are reduced by one order of magnitude, e.g., the image distortion correction table is reduced by one dimension. This beneficial advantage reduces the variables to the viewing angle (V), the field of view angle (F) and the raster line number and is necessary for the practical elimination of the distortion.

The second distortion elimination technique involves tilting the view window or computational plane of the computer image generator 144. It is assumed that the image source for the display image 106 is a computer image generator. The usual computation method is to compute the X and Y coordinates on a computational surface or plane 186 that is located between the pilot and the artificial scene, e.g., the display image 106 as shown in FIG. 10. The computational plane 186 is also referred to as the computer image generator (CIG) view window. The CIG view window is usually perpendicular to the line from the pilot's eye to the center of the display image 106. The distance from the pilot to the computational plane is not important.

The X-coordinates can be assumed to be the position of the raster lines while the Y- coordinates can be assumed to be the positions of the pixels along any given raster line. Typically, there are several hundred raster lines with several hundred pixels on each raster line. A point 188 appearing on the surface of the display image 106 can be selected and thereafter mapped onto the CIG view window or computational plane 186. This is accomplished by extending a line 190 from point 188 on the display image to the pilot's eye as shown in FIG. 10. The (x, y) coordinates which identify the point at which line 190 passes through the computation plane 186 is the mapped point corresponding to point 188 on the display image. Likewise, each of the points appearing on the disclosed surface of the display image 106 can be similarly mapped onto the computational plane 186. For a viewing angle (V) greater than zero and in the absence of tilt compensation of the computation plane 186 (CIG view window), the raster lines exhibit a V-shaped distortion in that they are closer at the top than at the bottom as shown in FIG. 13.

Figure 12:
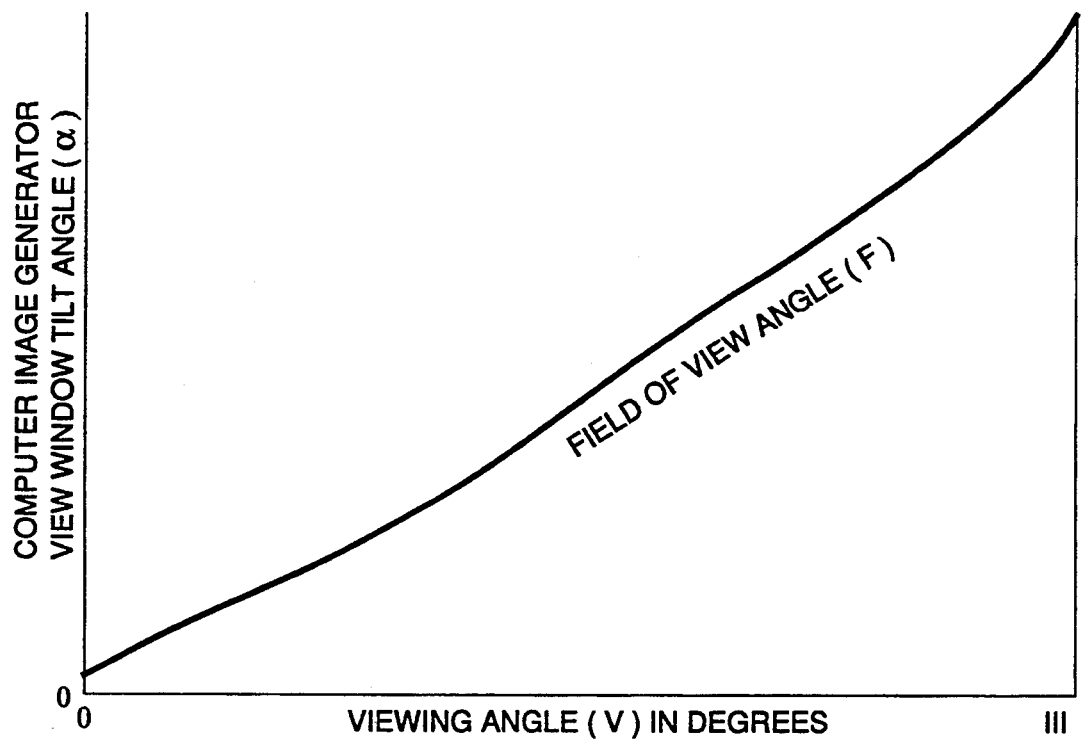
FIG. 12 is a graph showing a curve used to select the optimum computer image generator view window tilt angle (α) at various viewing angles (V) and a fixed value of field of view angle (F).

As in each of the other calculations, the host computer 146 provides data to the computer image generator 144 for tilting the computation plane 186 (CIG view window). The purpose of tilting the computation plane 186 is to compensate for the V-shaped distortion in the raster lines. The data provided to the computer image generator 144 indicates that the computation plane 186 should be optimally tilted to an angle ($\alpha$) as shown in FIG. 11. The optimal tilt angle ($\alpha$) for every viewing angle (V) and field of view angle (F) combination is calculated and stored in the host computer 146. A graph illustrating a curve utilized by the host computer 146 for selecting the proper tilt angle ($\alpha$) at viewing angles (V) in the range of (0–111) degrees and a fixed value of field of view angle (F) is shown on FIG. 12. Thereafter, when the host computer identifies a viewing angle (V) and field of view angle (F) combination, the proper tilt angle data is transmitted to the computer image generator 144. It is noted that the CIG view window tilt angle ($\alpha$) is a monotonic increasing function of viewing angle (V) and that the curve is derived from best fit of theoretical distortion data.

The optimal tilt of the computation plane 186 at the angle ($\alpha$) is shown in FIG. 11. When the point 188 located on the display image 106 is mapped onto the computation plane 186, a different coordinate (x', y') is indicated. This is accomplished as in the absence of tilt compensation (FIG. 10) by extending the line 190 from point 188 to the pilot's eye. The (x', y') coordinates which identify the point at which line 190 passes through the computation plane 186 is the mapped point corresponding to point 188 on the display image 106. In the presence of CIG view window tilt compensation, the raster lines are now parallel and undistorted as shown in FIG. 14.

FIG. 13 shows how the CIG view window appears to the pilot when the viewing angle (V) is approximately ninety degrees in the absence of tilt compensation. The left vertical axis measures time in microseconds while the right vertical axis measures viewing angle (V) in degrees. The horizontal axis is calibrated in degrees. The individual television raster lines $R-1$, R and $R+1$ are shown as V-shaped distorted vertical lines and the individual pixels $P-1$, P and $P+1$ are shown positioned on the raster lines. Note that the television raster lines are not parallel to each other. In particular, each raster line is distorted differently compared to every other raster line. Further, the spacing of the pixels along a particular raster line is not uniform. Also, the position of a particular pixel "P" varies from one raster line to the next.

By tilting the CIG view window or computation plane 186, the television raster lines can be made parallel as shown in FIG. 14. Instead of being perpendicular to the line of sight of the pilot, the computation plane 186 (CIG view window) is tilted to the optimal angle ($\alpha$) until the raster lines seen by the pilot are approximately parallel. This distortion correction technique is shown in FIGS. 10 and 11 and the result of applying the technique of tilting the CIG view window is shown in FIG. 14. Note that television raster lines $R-1$, R and $R+1$ are approximately parallel.

Figure 15:
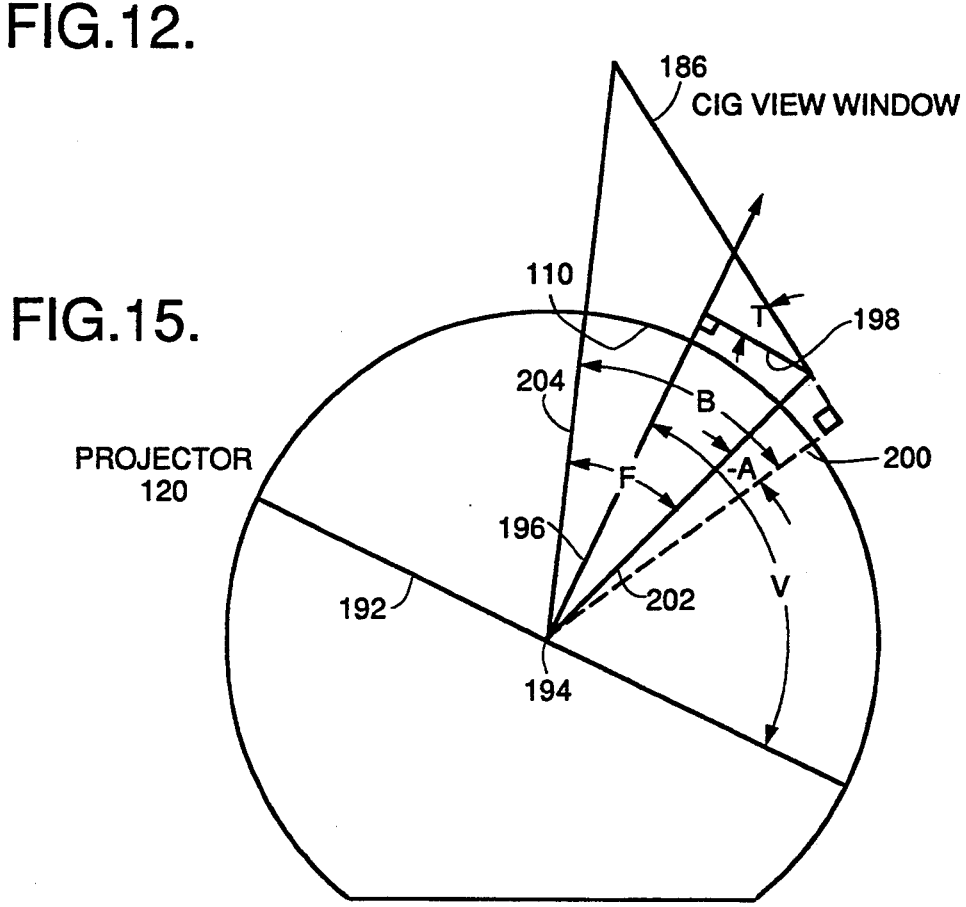
FIG. 15 is a graph showing the construction of the computer image generator view window of FIG. 14 in the presence of view window tilt compensation.

The construction of the tilted CIG view window is shown in FIG. 15. A plurality of variables exist in the construction of the tilted CIG view window and will now be described. The viewing angle (V) is the angle between the axis 192 of the image projector 120 through the center 194 of the dome 116 and the line 196 from the center 194 of the dome 116 to the view window 186. The field of view of the display image 106 is illustrated by the angle F. The angle between the CIG view window (computation plane 186) and a line 198 normal to line 196 is shown by the angle T. The angle between a line 200 normal to the CIG view window (computation plane 186) and a lower edge 202 of the display 106 is the angle ($-A$). Finally, the angle between the line 200 normal to the CIG view window and the upper edge 204 of the display 106 is the angle B. Note that the angle T is a function of the viewing angle (V) as indicated below:

$$T = \text{Function of (V)} \qquad [3]$$

an empirical best fit. Further, the following two relations also exist:

$$A = F/2 - T \qquad [4]$$

$$B = F - A \qquad [5]$$

By way of example, if the viewing angle (V) equals 90 degrees, the field of view angle F equals 40 degrees, and the angle T equals 28 degrees (which provides the most parallel raster lines), then based on equations [4] and [5], $$A = F/2 - T = 40/2 - 28 = 20 - 28 = -8 \text{ degrees}$$

$$B = F - A = 40 - (-8) = 48 \text{ degrees}$$

As will be shown hereinbelow, if the television raster lines are parallel, then the spacing between the raster lines can easily be adjusted such that the pilot sees a display that has an aspect ratio of 1:1. An aspect ratio of 1:1 is indicative of an undistorted display image 106 having equal angular height and width.

Figure 16:
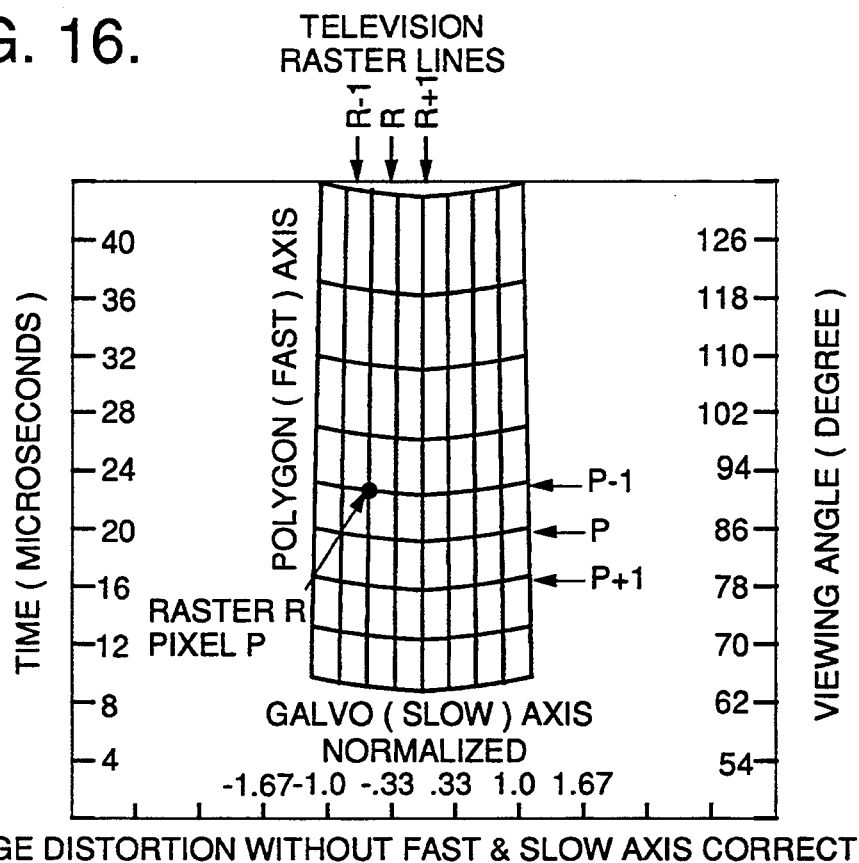
FIG. 16 is a graph of the projected image showing the pixel display time for each raster line and the spacing between the raster lines in the absence of raster line spacing compensation.

The third distortion elimination technique involves correcting the non-linear pixel spacing along each raster line. This relationship is shown by the graph on FIG. 16 which illustrates the non-linear pixel spacing along each of the raster lines. There is a relationship between the time that pixel "P" is displayed on raster line "R" and the viewing angle (V) at which the pilot sees the displayed pixel "P". For example, in order to move the pixel "P" upward in the display, it is necessary to display the pixel at a later time. Likewise, in order to move the pixel "P" downward in the display, it is necessary to display the pixel at an earlier time. Thus, for each viewing angle (V), it is possible to calculate the time to display each pixel for each raster line. This calculation is accomplished with a pixel correction matrix where the size of the matrix is as follows:

Pixel Correction Matrix = number of viewing angles (V) × number of fields of view × number of pixels × number of raster lines     [6]

Figure 17:
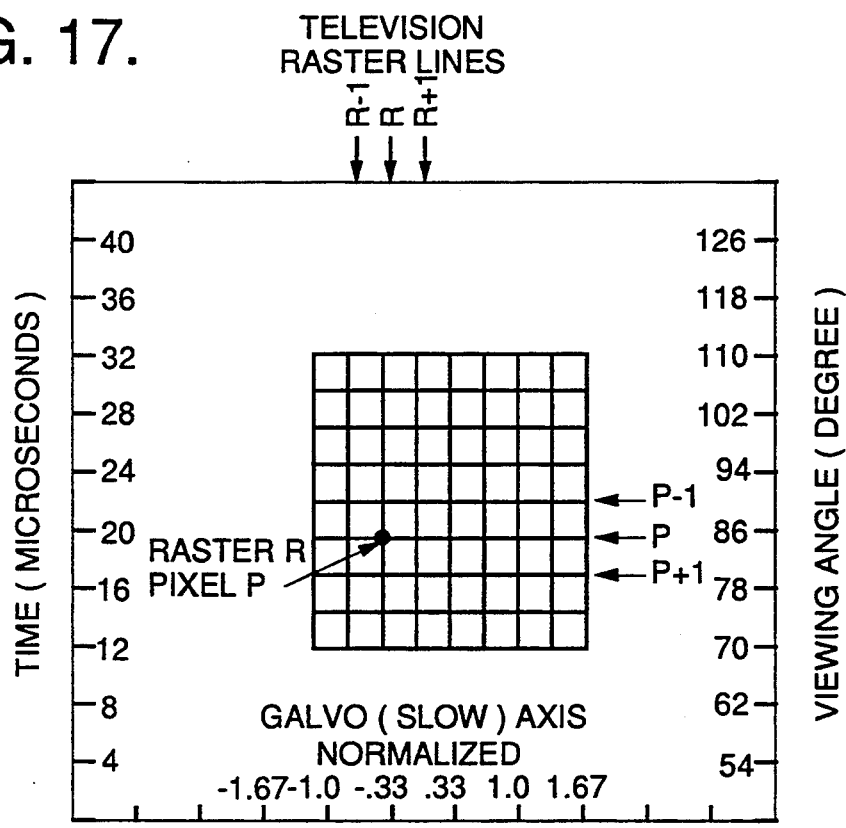
FIG. 17 is a graph of the projected image showing the pixel display time for each raster line and the spacing between the raster lines in the presence of raster line spacing compensation.

Typically, the viewing angle (V) ranges from (0–110) degrees, the field of view angle (F) ranges from (4–40) degrees, the number of pixels per raster line is 960, and the number of active raster lines is 799. The size of the pixel correction matrix can be reduced by storing data for integer values of viewing angle (V) and field of view angle (F). For fractional values of viewing angle (V) and field of view angle (F), the pixel time-to-display data can be obtained by extrapolating between integer values of viewing angle (V) and field of view angle (F). The memory requirements can be further reduced by interpolation between every eight raster lines and using left/right symmetry. The total memory is reduced by sixteen fold. The result of correcting for the non-linear pixel spacing as described in the third distortion elimination technique is shown in FIG. 17 in combination with the fourth distortion elimination technique. Note that movement of the pixel "P" up and down in the display is relative to the center of the small circles 180 shown in FIGS. 8 and 9. The design of the dynamic distortion correction apparatus 100 indicates that it is better to sweep the raster outward from the center of the small circles 180 rather than inward. For different simulators 112, the location of the image projectors 118, 120 will be different and consequently, the centers of the small circles 180 will change.

The fourth distortion elimination technique involves "stretching" the spacing between the raster lines. The amount of stretch is a function of viewing angle (V) and the field of view angle (F). A matrix, similar to the pixel correction matrix utilized in the third distortion elimination technique, stores the data for integer values of viewing angle (V) and field of view angle (F) in the electronics subassembly 102. For fractional values of viewing angle (V) and field of view angle (F), the stretch data can be obtained by extrapolating between the stored integer values of viewing angle (V) and field of view angle (F). For a laser image projector 120, the stretching of the spacing between the raster lines is accomplished by increasing the voltage drive signal from the laser control electronics subassembly 102 to the galvonometer sweep control 150 shown in FIG. 2. The increased voltage drive signal deflects the mirror positioned on the galvonometer 168 onto which the video modulated beam from the modulation device 104 impinges.

Figure 18:
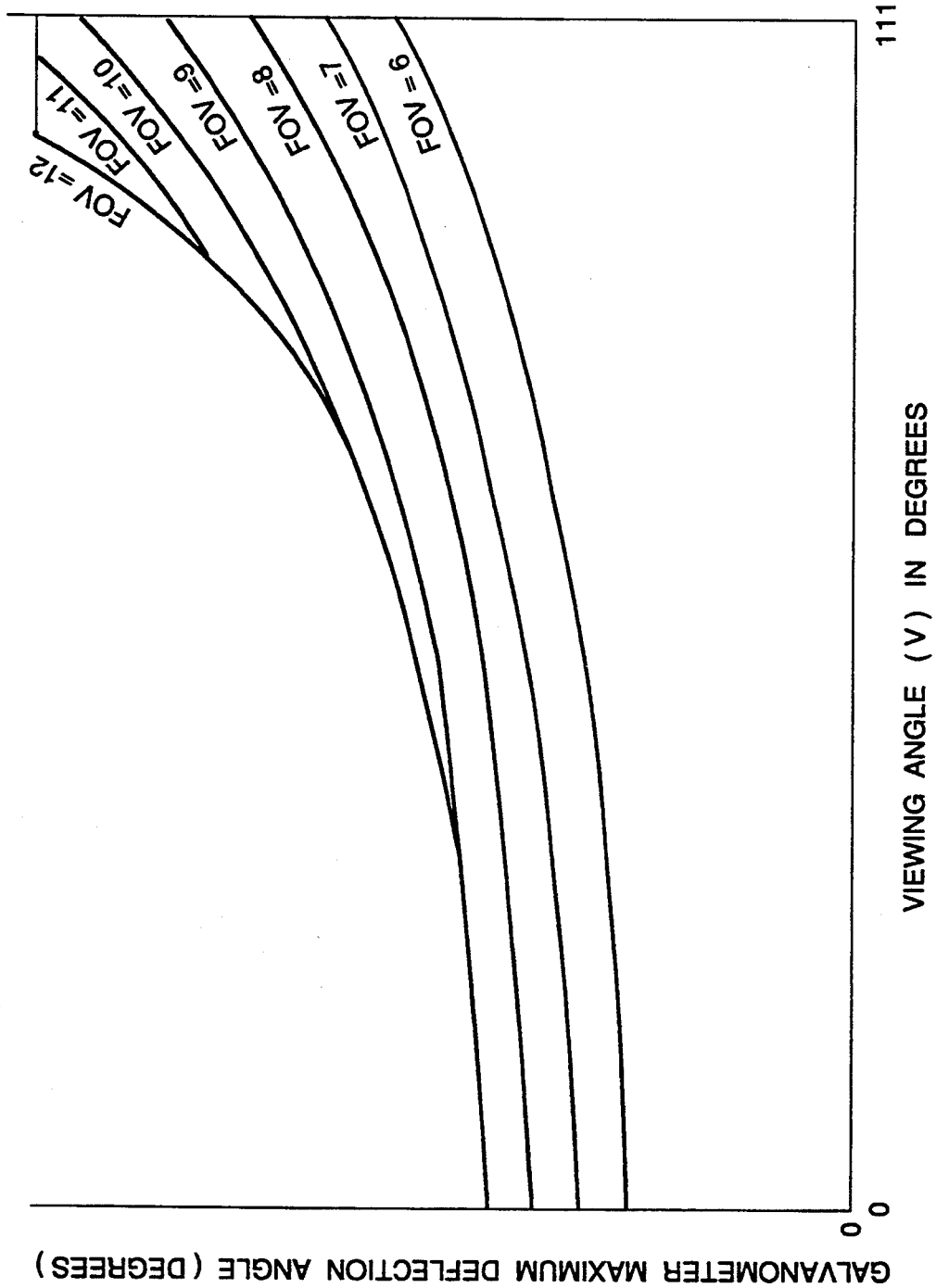
FIG. 18 is a graph of the maximum deflection angle of the galvonometer for a viewing angle (V) within the range of (0-111) degrees and a field of view angle (F) within the range of (6-12) degrees in the presence of raster line spacing compensation.
Figure 19:
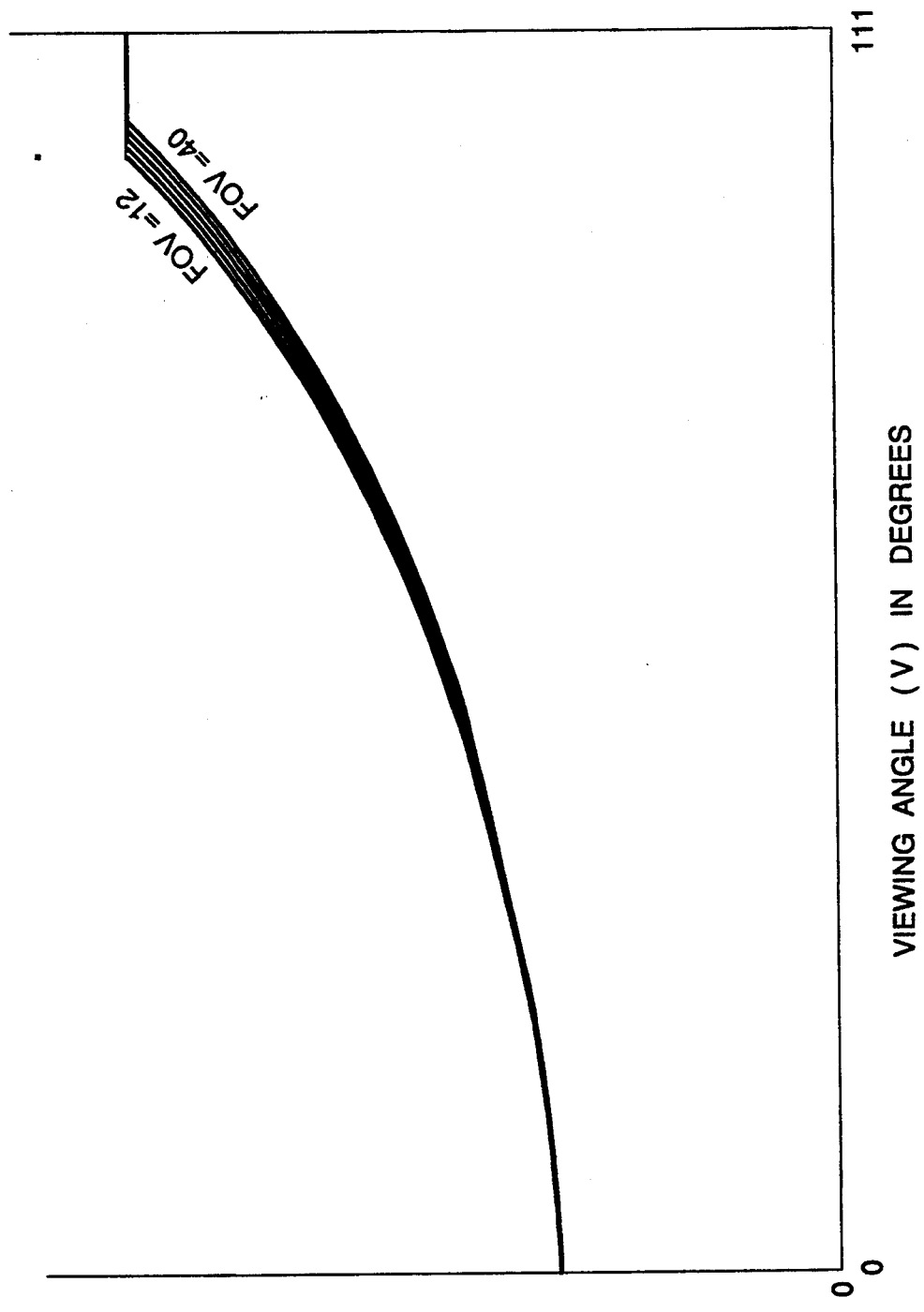
FIG. 19 is a graph of the maximum deflection angle of the galvonometer for a viewing angle (V) within the range of (0-111) degrees and a field of view angle (F) within the range of (12-40) degrees in the presence of raster line spacing compensation.

The maximum deflection angle of the galvonometer 168 is a function of both the viewing angle (V) and the field of view angle (F). The viewing angle (V) data and the field of view angle (F) data stored in the electronics subassembly 102 is illustrated in the form of graphs in FIGS. 18 and 19. In both FIGS. 18 and 19, the maximum deflection angle of the galvonometer 168 is shown on the vertical axis while the viewing angle (V) is shown ranging from (0–111) degrees on the horizontal axis. FIG. 18 shows the proper galvonometer maximum deflection angle for a particular viewing angle (V) for various field of view angles (F) ranging from (6–12) degrees. FIG. 19 shows the proper galvonometer maximum deflection angle for a particular viewing angle (V) for various field of view angles (F) ranging from (12–40) degrees. The graphs shown in both FIGS. 18 and 19 are derived from best fit of theoretical distortion data.

The desired result after correcting the pixel display time for each raster line (as discussed in the third distortion elimination technique) and after correcting the spacing between each raster line (as discussed in the fourth distortion elimination technique) is shown in FIG. 17. Note that the desired result approximates the undistorted aspect ratio (width/height) of 1:1. It has been shown that the correction is within 3% of the undistorted display geometry.

Thus, the present invention has been described wherein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. A dynamic distortion correction apparatus for use in an image projector comprising:
   first means for generating an image comprising a plurality of raster lines;
   second means for rotating said image so that said raster lines extend radially from a projection axis thereof;
   third means for causing each of said plurality of raster lines to be parallel to every other raster line to compensate for distortion in said image at any viewing angle;
   fourth means for linearly spacing said plurality of raster lines to compensate for distortion in said image at any viewing angle; and
   fifth means for linearly spacing a plurality of pixels along each of said raster lines to compensate for distortion in said image at any viewing angle.

2. The invention of claim 1 wherein said second means includes a prism.

3. The invention of claim 2 wherein said second means includes a Pechan prism.

* * * * *